(12) United States Patent
Tax et al.

(10) Patent No.: US 12,028,275 B1
(45) Date of Patent: Jul. 2, 2024

(54) SYSTEMS AND METHODS FOR LOCKING IN OFFSETS ASSOCIATED WITH RESOURCE REQUESTS

(71) Applicant: The Toronto-Dominion Bank, Toronto (CA)

(72) Inventors: David Samuel Tax, Toronto (CA); Milos Dunjic, Oakville (CA); Pranay Chander Gupta, Toronto (CA); Hitesh Bajaj, Duluth, GA (US); Kushank Rastogi, Toronto (CA); Abeera Aguiar, Princeton Junction, NJ (US)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/455,862

(22) Filed: Aug. 25, 2023

(51) Int. Cl.
*G06Q 40/04* (2012.01)
*H04L 47/70* (2022.01)
*H04L 47/762* (2022.01)

(52) U.S. Cl.
CPC ........... *H04L 47/826* (2013.01); *G06Q 40/04* (2013.01); *H04L 47/762* (2013.01)

(58) Field of Classification Search
None
See application file for complete search history.

(56) References Cited

U.S. PATENT DOCUMENTS

| | | | |
|---|---|---|---|
| 11,676,226 B1 | 6/2023 | Hailey et al. | |
| 11,790,418 B1* | 10/2023 | Jay | H04L 9/3213 |
| | | | 705/26.1 |
| 2007/0233616 A1* | 10/2007 | Richards | G06Q 10/06 |
| | | | 705/400 |
| 2008/0015890 A1 | 1/2008 | Malyala | |
| 2010/0042453 A1 | 2/2010 | Scaramellino et al. | |
| 2010/0318373 A1 | 12/2010 | Harris | |
| 2014/0351014 A1 | 11/2014 | Lopez | |
| 2017/0329357 A1 | 11/2017 | Torres et al. | |
| 2021/0151202 A1* | 5/2021 | Jabbar | G16Y 40/10 |
| 2022/0276222 A1* | 9/2022 | Beal | G01N 33/0031 |
| 2023/0297920 A1* | 9/2023 | Morgan | E21B 31/107 |
| | | | 705/7.37 |
| 2024/0062280 A1* | 2/2024 | Sathe | G06Q 30/08 |

FOREIGN PATENT DOCUMENTS

AU 2015101686 1/2016

* cited by examiner

*Primary Examiner* — Mohamed Ibrahim
(74) *Attorney, Agent, or Firm* — Rowand LLP

(57) ABSTRACT

Methods and computer systems for locking in offsets associated with resource requests. Receiving input of a resource request amount for a resource request, the resource request associated with a defined period of time and a property. Determining, based on data indicating one or more characteristics of the property, a metric representing an expected quantity of emissions over the defined period of time. Identifying an application programming interface capable of processing a request to lock in an amount for an offset product. Using the application programming interface and the metric to determine an offset amount to offset the expected quantity of emissions. Determining a periodic data transfer amount for the resource request that is based on the resource request amount and the offset amount. Outputting the periodic data transfer amount. Receiving an instruction to initiate the resource request and using the application programming interface to lock in the offset amount.

20 Claims, 6 Drawing Sheets

MORTGAGE APPLICATION

Enter the following information in order to initiate a mortgage.

MORTGAGE

702 — Amount: $
Duration: Select an amortization period ▼

PROPERTY

704 — Address:
Sq Ft:
Heat Source: Select the heat source ▼
Year:
Walkability Score:
Utility Bill: Enter a local filename to upload

WORKPLACE

706 — Address:
Travel: Select the means of travel ▼

CARBON OFFSETS

708 — ● Select by type ▼
○ Select by vendor ▼
○ Select by country ▼

Submit — 710

700

FIG. 7

SYSTEMS AND METHODS FOR LOCKING IN OFFSETS ASSOCIATED WITH RESOURCE REQUESTS

FIELD

The present disclosure relates to resource requests and, more particularly, to systems and methods for locking in offsets associated with resource requests.

BACKGROUND

Computer systems process requests that may be associated with a carbon impact. It would be advantageous to address the carbon impact associated with such requests.

BRIEF DESCRIPTION OF THE DRAWINGS

Reference will now be made, by way of example, to the accompanying drawings which show example embodiments of the present application, and in which:

FIG. 7 is an example graphical input interface in connection with uploading data associated with a resource request and generating an offset amount associated with the resource request.

Similar reference numerals may have been used in different figures to denote similar components.

DETAILED DESCRIPTION OF EXAMPLE EMBODIMENTS

Figure 1:
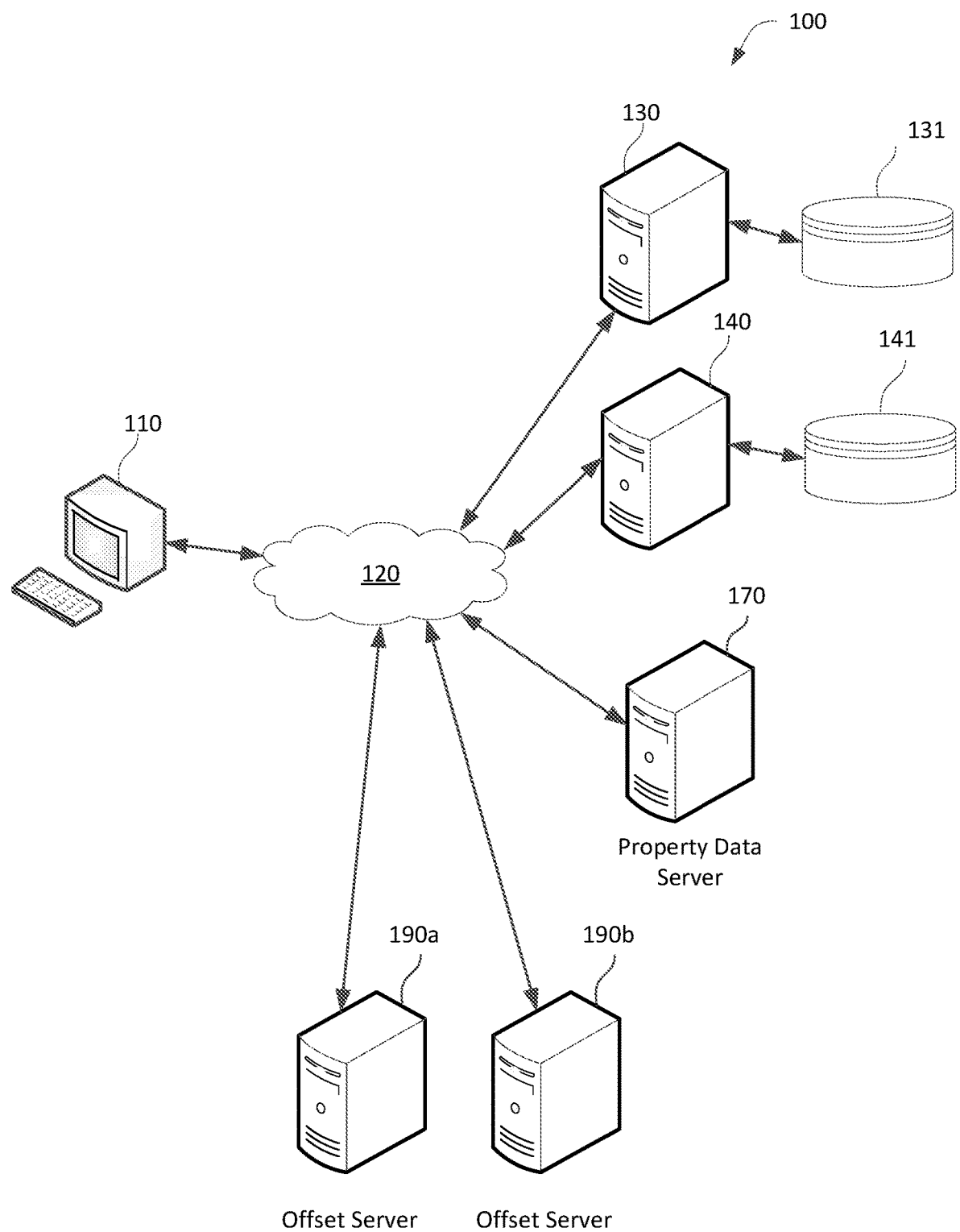
FIG. 1 shows a schematic diagram illustrating an operating environment of an example embodiment according to the subject matter of the present application.

In one embodiment, the present application describes a computer system. The computer system may include a communications module; one or more processors coupled to the communications module; and a memory coupled to the one or more processors. The memory may store instructions that, when executed by the computer system, cause the computer system to receive, via an input interface, input of a resource request amount for a resource request, the resource request associated with a defined period of time and a property; obtain data indicating one or more characteristics of the property; determine, based on the data indicating one or more characteristics of the property, a metric representing an expected quantity of emissions over the defined period of time; identify an application programming interface (API) capable of processing a request to lock in an amount for an offset product; use the application programming interface and the metric to determine an offset amount to offset the expected quantity of emissions; determine a periodic data transfer amount for the resource request that is based on the resource request amount and the offset amount; output the periodic data transfer amount; receive an instruction to initiate the resource request; and use the application programming interface to lock in the offset amount.

In some implementations, the instructions, when executed by the computer system, may further cause the computer system to provide an input interface including a selectable option to redetermine the periodic data transfer amount based on one or more emission-reducing improvements to the property.

In some implementations, the instructions, when executed by the computer system, may further cause the computer system to include in the resource request an amount set aside for emission-reducing improvements to the property.

In some implementations, the instructions, when executed by the computer system, may further cause the computer system to provide an input interface including a selectable option to purchase the determined offset amount of the offset product.

In some implementations, the instructions, when executed by the computer system, may further cause the computer system to provide an input interface including a selectable option to initiate the resource request, wherein the resource request includes an amount for the determined offset amount.

In some implementations, the data indicating one or more characteristics of the property may include travel data relating to travel between the property and another location.

In some implementations, the data indicating the one or more characteristics of the property may include historical data indicating energy usage corresponding to use of the property.

In some implementations, the instruction that, when executed by the computer system, cause the computer system to identify the application programming interface capable of processing a request to obtain offsets may include instructions that further cause the computer system to identify the application programming interface, from amongst a plurality of application programming interfaces, based on a certification of the offset product.

In some implementations, the instruction that, when executed by the computer system, cause the computer system to identify the application programming interface capable of processing a request to obtain offsets may include instructions that further cause the computer system to identify the application programming interface, from amongst a plurality of application programming interfaces, based on a project type of the offset product.

In some implementations, the instruction that, when executed by the computer system, cause the computer system to identify the application programming interface capable of processing a request to obtain offsets may include instructions that further cause the computer system to identify the application programming interface, from amongst a plurality of application programming interfaces, based on a location of an offset project of the offset product.

In another aspect, the present application describes a computer-implemented method. The computer-implemented method may include receiving, via an input interface, input of a resource request amount for a resource request, the resource request associated with a defined period of time and a property; obtaining data indicating one or more characteristics of the property; determining, based on the data indicating one or more characteristics of the property, a metric representing an expected quantity of emissions over the defined period of time; identifying an application programming interface capable of processing a request to lock in an amount for an offset product; using the application programming interface and the metric to determine an offset amount to offset the expected quantity of emissions; determining a periodic data transfer amount for the resource request that is based on the resource request amount and the offset amount; outputting the periodic data transfer amount; receiving an instruction to initiate the resource request; and using the application programming interface to lock in the offset amount.

In some implementations, the method may further include providing an input interface including a selectable option to redetermine the periodic data transfer amount based on one or more emission-reducing improvements to the property.

In some implementations, the method may further include including in the resource request an amount set aside for emission-reducing improvements to the property.

In some implementations, the method may further include providing an input interface including a selectable option to purchase the determined offset amount of the offset product.

In some implementations, the method may further include providing an input interface including a selectable option to initiate the resource request, wherein the resource request includes an amount for the determined offset amount.

In some implementations, identifying the application programming interface capable of processing a request to obtain offsets may include identifying the application programming interface, from amongst a plurality of application programming interfaces, based on a of certification of the offset product.

In some implementations, identifying the application programming interface capable of processing a request to obtain offsets may include identifying the application programming interface, from amongst a plurality of application programming interfaces, based on a project type of the offset product.

In yet another aspect, present application describes a non-transitory computer-readable storage medium comprising processor-executable instructions which, when executed, may configure one or more processors to receive, via an input interface, input of a resource request amount for a resource request, the resource request associated with a defined period of time and a property; obtain data indicating one or more characteristics of the property; determine, based on the data indicating one or more characteristics of the property, a metric representing an expected quantity of emissions over the defined period of time; identify an application programming interface capable of processing a request to lock in an amount for an offset product; use the application programming interface and the metric to determine an offset amount to offset the expected quantity of emissions; determine a periodic data transfer amount for the resource request that is based on the resource request amount and the offset amount; output the periodic data transfer amount; receive an instruction to initiate the resource request; and use the application programming interface to lock in the offset amount.

In yet a further aspect, the present application describes a non-transitory computer-readable storage medium storing processor-readable instructions that, when executed, configure one or more processors to perform any of the methods described herein. Also described in the present application is a computing device comprising: one or more processors, memory, and an application containing processor-executable instructions that, when executed, cause the one or more processors to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, reference is made to an offset product. An offset product may refer to a carbon-offset product. In some embodiments, a carbon-offset product may be sold by a vendor of carbon-offsets. A carbon-offset product may be certified by a certification body as meeting one or more defined standards. The defined standard may be a national or global offset standard. A carbon-offset product may correspond to a type of carbon-offset project. Example types of carbon-offset projects include renewable energy (e.g. wind farms), methane capture, and afforestation/reforestation. An offset project may be based in, occur or be implemented in a particular geographic area or location, such as a country. The rights to the carbon reductions from an offset project may be purchased and applied against carbon emissions to reduce net carbon impact.

The term "real-time", "near real-time", or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 millisecond, less than 1 second, or less than 5 seconds.

Example embodiments of the present application are not limited to any particular operating system, system architecture, mobile device architecture, server architecture, or computer programming language.

FIG. 1 shows a schematic diagram illustrating an operating environment of an example embodiment. The various components cooperate to provide a computing system 100 which may be used, for example, to lock in an offset associated with a resource request. The resource may be currency, physical assets, credits, tokenized items like non-fungible tokens, computing resources such as memory allocated or processor time, access rights, or any other resource that may be owned or credited to an account associated with an account holder. The resource request may be a request to access, use, and/or borrow a resource. In many of the examples herein, monetary resources may be referenced to illustrate concepts, but the present application is not necessarily solely applicable to financial or monetary instruments or resources.

The operating environment in this example includes a client device 110, first system 130, second system 140, property data server 170 and offset servers 190. In some embodiments, the operating environment may include one or more client devices or a plurality of client devices, which may include the client device 110.

The client device may be associated with an entity, such as a user or entity, having a logical storage area such as a record in a database associated with and/or provided by the first computing system 130. The record may be or represent account data or other data maintained by the first system 130. The logical storage area, such as the record, may include data of various types and the nature of the data will depend on the nature of the first system 130. By way of example, in some implementations, the record may include, for example, documents and/or other data stored by or on behalf of a user. By way of example, in an implementation, a user account may include documents or data uploaded by the user. Such documents and/or data may include, for example, any one or more of: images such as photographs, text-based documents, documents prepared according to a standardized file format, such as portable document format (PDF) documents, user preferences, digital identity data such as stored identity information or documentation, or other types of documents and/or data.

The first system 130 may be configured to authenticate the client device 110 as being associated with a particular account. More particularly, the first system 130 may authenticate the client device 110 as being associated with account data maintained by the first system 130. Authentication may be performed based on one or more credential such as, for example, a password, username, PIN, fingerprint, etc.

In some embodiments, the first system 130 may provide a front-end interface which allows the client device 110 to interact with the first system 130. For example, the first system 130 may provide one or more graphical user interfaces (GUIs) to the client device 110. By way of example, the first system 130 may provide, to the client device 110, a user interface for uploading data in an authenticated session. The user interface provided to the client device 110 may be an interface for receiving user input associated with a resource request, including a resource demand. A resource demand may indicate a transfer of a resource between the account associated with the first computing system and the account associated with the second computing system and/or a request for a transfer of a resource.

The first system 130 may be managed, operated, and/or controlled by an entity that may be an agent of a first account holder and may be a financial institution, such as a bank. The first account holder may be a customer (e.g. a corporate/business customer) or client of the entity or otherwise associated with the entity. In some embodiments, the first account holder is a requestor or transferee of a data transfer.

The first system 130 may further store data regarding users or customers associated with the first system 130 in in data store 131. The data store 131 may include records associated with a plurality of entities. For example, the records may be for a plurality of accounts and at least some of the records may define or store resources. For example, the records may define a quantity of resources. For example, the entity that is associated with the client device 110 may be associated with an account having one or more records in the database. The records may reflect a quantity of stored resources that are associated with the entity. Such resources may include owned resources and, in at least some embodiments, borrowed resources. The resources that are associated with an entity may be grouped into various buckets. Some such buckets may, for example, represent individual bank accounts. For example, an entity may be associated with one or more bank accounts. At least some of the resources may be borrowed resources. The borrowed resources may, for example, represent an amount of credit that is available to the entity. In some embodiments, a resource may be or include stored value, such as fiat currency. The entity that is associated with the client device 110 and the account may be a customer of a financial institution which operates or manages the first computing system 130.

The first computing system 130 may also store data regarding a mapping of an identifier associated with an offset (e.g. an offset product type) to an application programming interface corresponding to one of the offset servers 190. The mapping may be stored in data store 131.

The first system 130 may include several additional components. For example, the system may include an optical character recognition (OCR) engine and a natural language processing (NLP) engine. The optical character recognition engine may be adapted to receive an electronic document and extract text from the document. The text may include be free-form or unstructured text. The natural language processing engine may be adapted to receive the text. The natural language processing engine may identify, based on the text, a consumption amount and a type of resource. The consumption amount may be considered the result of applying a mapping between unstructured text describing a resource demand, a resource type and/or a consumption amount and a set of possible classifications to the free-form text. The natural language processing engine may operate in a variety of manners and may, in some embodiments, employ known natural language processing techniques. For example, support vector machines (SVMs) and/or convolutional neural networks (CNNs) may be employed by the natural language processing engine. In some implementations, the natural language processing engine may correspond to and/or may employ one or more commercially-available software packages and/or services for natural language classification. In a particular example, the natural language processing engine may employ one or more natural-language processing neural networks. Such neural networks and, more broadly, the natural language processing engine may, in some embodiments, be trained, at least initially using a training set (a data set for training) including unstructured texts describing the resource demand and corresponding recipient.

Notably, a skilled person will recognize that employing natural language processing techniques to provide an implementation of the natural language processing engine consistent with the description of the system and, more broadly, consistent with the present application necessarily requires the use of an electronic computer. This need for a computer is particularly clear when one considers the performance requirements necessary to realize benefits of the subject matter of the present application including the desire to facilitate accurate estimations of an expected quantity of emissions.

As illustrated, the first system 130 is in communication with the second system 140, property data server 170 and/or offset servers 190 via the network 120. The first system 130 may be configured to transmit to the second system 140 a message, for example, a transfer message. The second system 140 may be further configured to receive a transfer message from the first system 130. The first system 130 may also be configured to transmit to the property data server 170 a message, for example, a request for data indicating one or more characteristics of the property. The property data server 170 may be further configured to receive a property data request from the first system 130. The first system 130 may also be configured to transmit to the offset servers 190 a message, for example, a request for data regarding an offset product. The offset server 190 may be further configured to receive a data request from the first system 130, for example, a request for an offset amount.

The second system 140 may be managed, operated, and/or controlled by an entity that may be an agent of a second account holder and may be a financial institution, such as a bank. The second account holder may be a customer (e.g. a corporate/business customer) or client of the entity or otherwise associated with the entity. In some embodiments, the second account holder may, for example, be a recipient of a transfer from the first account holder and the transfer may represent a payment.

The second system 140 may store data regarding one or more computing events in a plurality of respective computing event objects. The second system 140 may further store data regarding users or customers associated with the second system 140 in a plurality of respective user account objects representing respective user accounts. The data may be stored in data store 141.

The first system 130 and second system 140 may be or include transfer processing systems. A transfer processing system may include a transfer processing module implemented as a software module and configured to process transfers such as transfers identified in transfer messages. By way of example, a processing module or system included in the first system 130 may be configured to perform internal transfers by transferring value between two different records in the data store 131 (i.e., between two accounts at the same financial institution) and/or to perform external transfers by interacting with the second system 140 or third party systems. For example, external transfers may be performed using various transfer methods or protocols. In some implementations, at least some transfers may be performed by interacting with other financial institution systems via a SWIFT (Society for Worldwide Interbank Financial Telecommunication) network. A transfer may be successfully processed and completed when value/resources have been successfully transferred from a transferor account to a recipient account. The processing system may track and store data identifying completed transfers.

The property data server 170 may be managed, operated, and/or controlled by a third-party that is independent of the first and second account holders. The property data server 170 may be, for example, a government managed, operated, or controlled external server. The property data server 170 may store data regarding one or more properties. In some embodiments, the data may represent a list of properties that are registered with a government. The property may be real or personal property. In many of the examples herein, real estate may be referenced to illustrate concepts, but the present application is not necessarily solely applicable to real estate.

The offset servers 190 may be managed, operated, and/or controlled by a third-party that is independent of the first and second account holders. The offset servers 190 may be, for example, a government managed, operated, or controlled external server. In some embodiments, the third-party may be a vendor of one or more offset products. Each particular offset server of the plurality of offset servers 190 may be associated with and correspond to a respective application programming interface.

The offset server 190 may store data regarding one or more offset products. In some embodiments, the data may represent an offset product registered with a government and/or certified by a third-party.

The client device 110, first system 130, second system 140, property data server 170 and offset servers 190 may be configured to ingest data from each other and may transmit requests, replies, alerts, notifications, configuration objects, or other data to each other.

The first system 130 may employ a property data service and an offset lock-in service provided by one or more external sources. The external source of the property data service may be the property data server 170 and the external source of the offset lock-in service may be one or more of the offset servers 190. The property data server 170 and offset servers 190 may provide services used by the first system 130.

The services provided by the property data server 170 and offset servers 190 may be incorporated into the services provided by the first system 130, such that when the client device 110 submits a particular request to the first system 130, such as clicking a particular link or button on a webpage, the first system 130 executes a call to one or more of the property data server 170 and/or offset servers 190. The first system 130 then provides its service to the client device 110 through the webpages of the first system 130.

The first system 130 may include one or more webpages, or links or other actionable portion of webpages, that when selected execute an application programming interface call to the property data service or offset lock-in service. The property data server 170 and/or offset servers 190 may receive data from the first system 130. The data may include any data relevant to providing the particular service, such as input data from the client device 110 that is previously stored by the first system 130 or data regarding interactions with the client device 110 during a current session with the first system 130. The offset servers 190 may send data indicating an offset amount to the first system 130 and the property data server 170 may send data indicating one or more characteristics of property to the first system 130.

The first system 130 may store data regarding a list of possible defined application programming interfaces. The plurality of application programming interfaces may be used by the first system 130 to identify a relevant application programming interface for determining an offset amount. In some embodiments, each particular application programming interface of the plurality of application programming interfaces represents a particular offset server in the plurality of offset servers 190.

The first system 130 and the second system 140 may store data in respective data stores 131 and 141. The data stores 131 and 141 are illustrated as single units for ease of illustration, but may include a plurality of storage units and, in some cases, storage media connected via the network 120.

As illustrated, the client device 110 is in communication with a first system 130 via a network 120. In some embodiments, the client device 110 may be managed, operated or controlled by the first account holder.

The client device 110 is a computing device and may be configured to receive input. It may, as illustrated, be a desktop computer. However, the client device 110 may be a computing device of another type such as, for example, a smart phone, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The client device 110 may be used, for example, to receive user input that includes an indication of a resource request. The user input may further include an indication of one or more parameters associated with a resource request. The one or more parameters may include a resource request amount, a duration of time associated with the resource request, and an identifier of a property (e.g. an address of the property) and other information to be included in or used to populate one or more fields in a resource request. The one or more parameters may also include data representing one or more characteristics of the property.

The first system 130, second system 140, property data server 170 and offset servers 190 are or include a computer system such as a computer server system, database management system, resource management systems, or data transfer systems. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, web servers, email servers, file transfer protocol (FTP) servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The client device 110, first system 130, second system 140, property data server 170 and offset servers 190 may be in geographically disparate locations.

The network 120 is a computer network. The network 120 may be an internetwork such as may be formed of one or more interconnected computer networks. For example, such a network may be or may include an Ethernet network, an asynchronous transfer mode (ATM) network, a wireless network, or the like. In some implementations, the network 120 may be the Internet. The network 120 allows the client device 110, first system 130, second system 140, property data server 170 and offset servers 190 to communicate with one another.

As further described below, the client device 110, first system 130, second system 140, property data server 170 and offset servers 190 may be configured with software to perform associated functions such as those described herein.

FIG. 1 illustrates the first system 130, second system 140, property data server 170, offset servers 190 and data stores 131 and 141 as separate and distinct computing devices. However, these systems may not be separate physical systems. For example, the first system 130 and the data store 131 may be implemented on a common physical device. As another example, the second system 140 and the data store 141 may be implemented on a common physical device. As yet another example, the first system 130 and second system 140 may be implemented in software associated with a common processor. As yet a further example, the data stores 131 and 141 may be included in the first system 130 and second system 140, respectively, or may be external to those systems.

Figure 2:
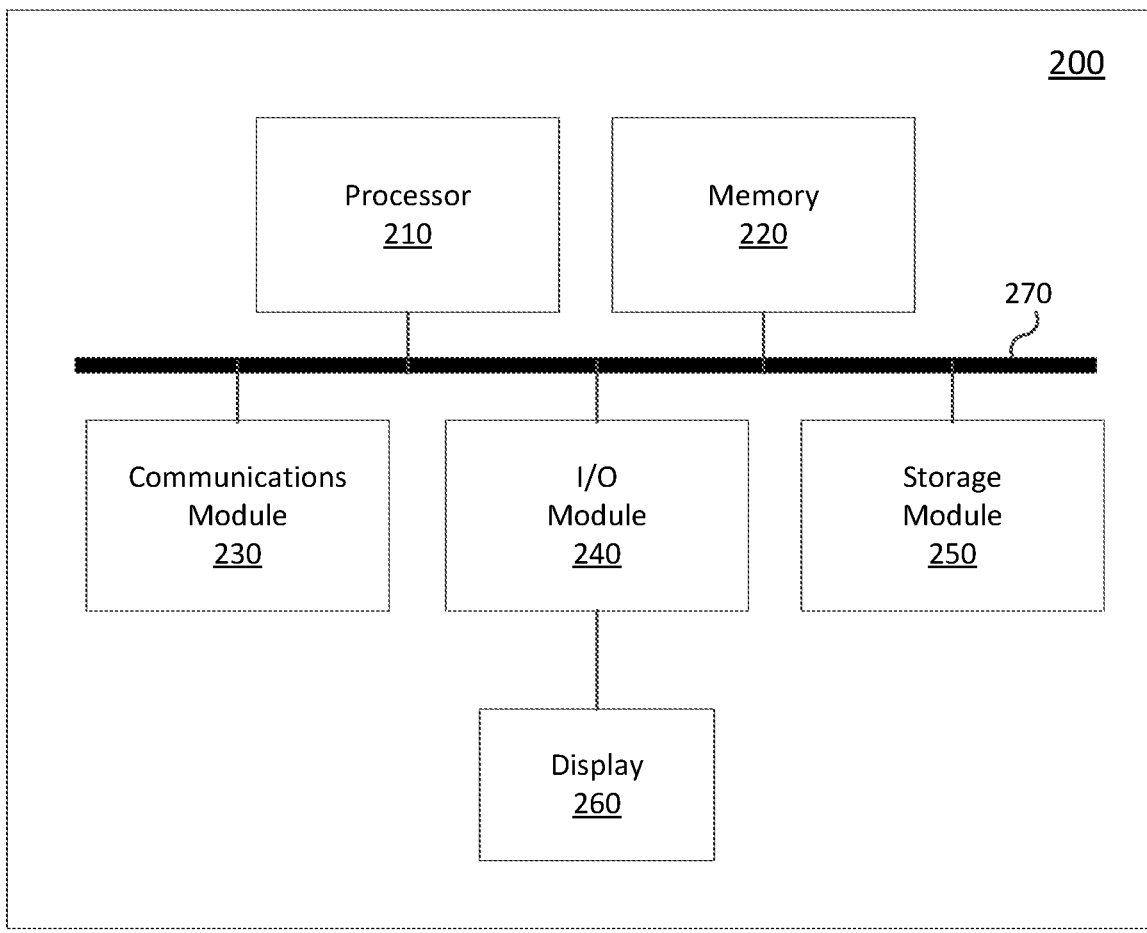
FIG. 2 shows a high-level schematic diagram of the client device of FIG. 1.

An example embodiment of the client device 110 will now be discussed with reference to FIG. 2. FIG. 2 is a high-level schematic diagram of the client device 110. The client device 110 may, in some embodiments, be a personal computer as shown in FIG. 1.

The client device 110 includes a variety of modules. For example, as illustrated, the example computing device 200 may include a processor 210, a memory 220, a communications module 230, an I/O module 240, and/or a storage module 250. As illustrated, the foregoing example modules of the example computing device 200 are in communication over a bus 270. As such, the bus 270 may be considered to couple the various modules of the client device 110 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the client device 110.

The communications module 230 allows the client device 110 to communicate with other computing devices and/or various communications networks such as, for example, the network 120. For example, the communications module 230 may allow the client device 110 to send or receive communications signals. Communications signals may be sent or received according to one or more protocols or according to one or more standards. The communications module 230 may allow the client device 110 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 230 may allow the client device 110 to communicate using near-field communication (NFC), via Wi-Fi™, using Bluetooth™ or via some combination of one or more networks or protocols. In some embodiments, all or a portion of the communications module 230 may be integrated into a component of the client device 110. For example, the communications module 230 may be integrated into a communications chipset.

The I/O module 240 is an input/output module. The I/O module 240 allows the client device 110 to receive input from and/or to provide input to components of the client device 110 such as, for example, various input modules and output modules. For example, the I/O module 240 may, as shown, allow the client device 110 to receive input from and/or provide output to the display 260.

The storage module 250 allows data to be stored and retrieved. In some embodiments, the storage module 250 may be formed as a part of the memory 220 and/or may be used to access all or a portion of the memory 220. Additionally or alternatively, the storage module 250 may be used to store and retrieve data from persisted storage other than the persisted storage (if any) accessible via the memory 220. In some embodiments, the storage module 250 may be used to store and retrieve data in/from a database. A database may be stored in persisted storage. Additionally or alternatively, the storage module 250 may access data stored remotely such as, for example, as may be accessed using a local area network (LAN), wide area network (WAN), personal area network (PAN), and/or a storage area network (SAN). In some embodiments, the storage module 250 may access data stored remotely using the communications module 230. In some embodiments, the storage module 250 may be omitted and its function may be performed by the memory 220 and/or by the processor 210 in concert with the communications module 230 such as, for example, if data is stored remotely.

The client device 110 may include or be connected to a display 260. The display 260 is a module of the client device 110. The display 260 is for presenting graphics. The display 260 may be, for example, a liquid crystal display (LCD). In addition to being an output device, the display 260 may also be an input device. For example, the display 260 may allow touch input to be provided to the client device 110. In other words, the display 260 may be a touch sensitive display module. In a particular example, the display 260 may be a capacitive touch screen.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
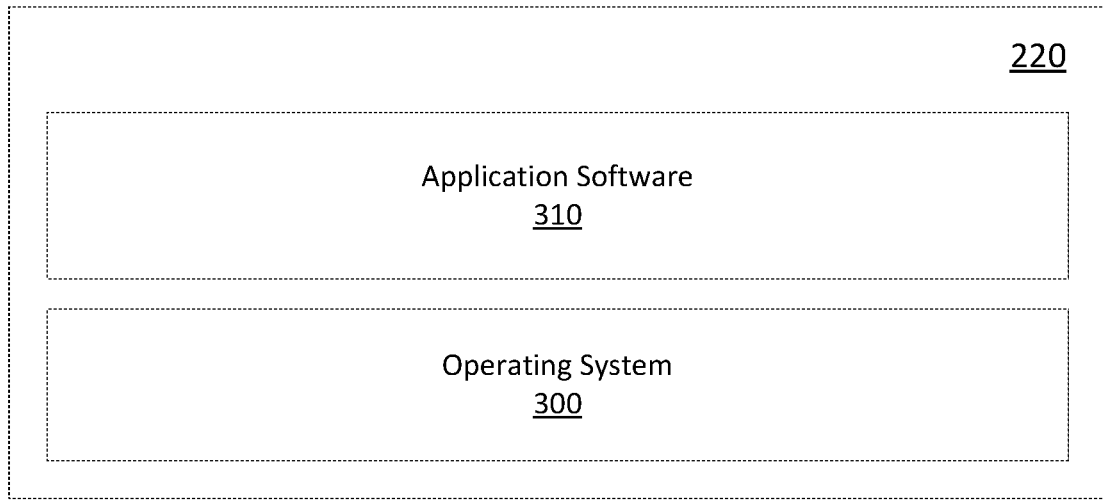
FIG. 3 shows a simplified organization of software components stored in a memory of the client device of FIG. 2.

FIG. 3 depicts a simplified organization of software components stored in the memory 220 of the client device 110. As illustrated, these software components include an operating system 300 and an application software 310.

The operating system 300 is software. The operating system 300 allows the application software 310 to access the processor 210 (FIG. 3), the memory 220, the communications module 230, the I/O module 240, and the storage module 250 of the client device 110. The operating system 300 may be, for example, Google™ Android™, Apple™ iOS™, UNIX™, Linux™, Microsoft™ Windows™, Apple OSX™ or the like.

The application software 310 adapts the client device 110, in combination with the operating system 300, to operate as a device for facilitating data transfers.

As noted above, the first system 130, and second system 140, are or include a computer system. An example computer system 400 will now be discussed with reference to FIGS. 4 and 5. Suitably-configured instances of the example computer system 400 may, in some embodiments, serve as and/or be a part of the first system 130, second system 140, property data server 170 and/or offset servers 190.

Figure 4:
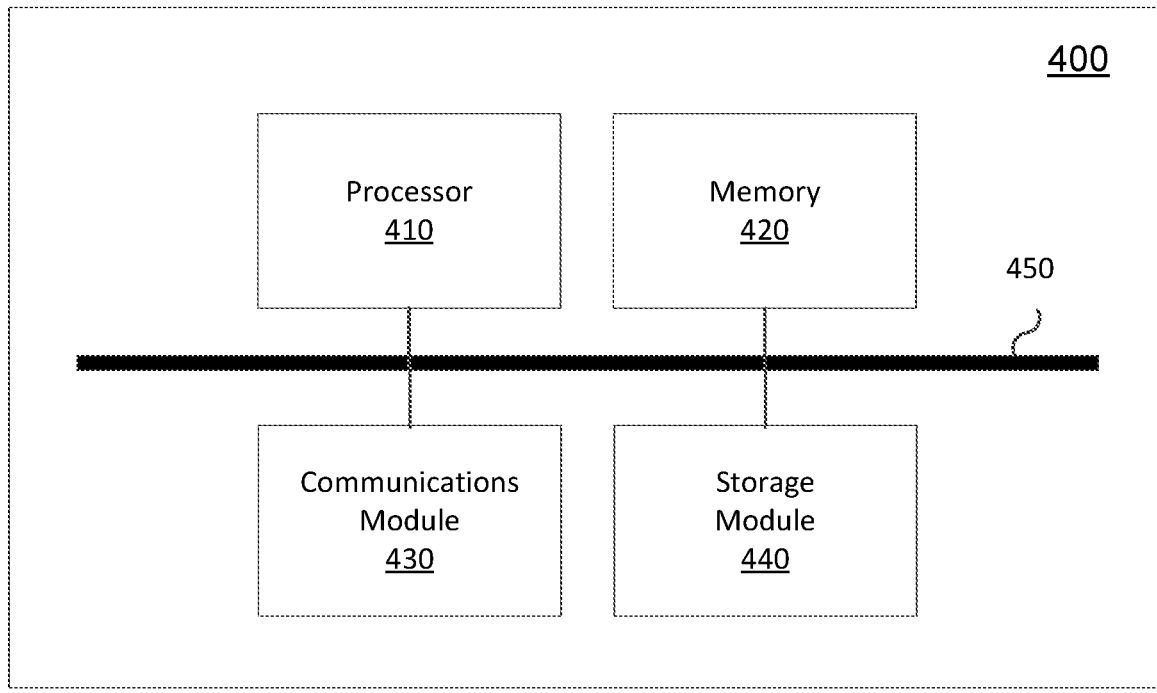
FIG. 4 shows a high-level schematic diagram of an example embodiment of the first computer system, second computer system, property data server, and offset server of FIG. 1.

FIG. 4 is a high-level schematic diagram of an example computer system 400.

The example computer system 400 includes a variety of modules. For example, as illustrated, the example computer system 400 may include a processor 410, a memory 420, a communications module 430, and/or a storage module 440. As illustrated, the foregoing example modules of the example computer system 400 are in communication over a bus 450. As such, the bus 450 may be considered to couple the various modules of the example computer system 400 to each other, including, for example, to the processor 410.

The processor 410 is a hardware processor. The processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer system 400.

The communications module 430 allows the example computer system 400 to communicate with other computing devices and/or various communications networks such as, for example, the network 120. The communications module 430 may allow the example computer system 400 to send or receive communications signals. Communications signals may be sent or received according to one or more protocols or according to one or more standards. For example, the communications module 430 may allow the example computer system 400 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 430 may allow the example computer system 400 to communicate via Wi-Fi™, using Bluetooth™ or via some combination of one or more networks or protocols. In some embodiments, all or a portion of the communications module 430 may be integrated into a component of the example computer system 400. For example, the communications module may be integrated into a communications chipset.

The storage module 440 allows the example computer system 400 to store and retrieve data. In some embodiments, the storage module 440 may be formed as a part of the memory 420 and/or may be used to access all or a portion of the memory 420. Additionally or alternatively, the storage module 440 may be used to store and retrieve data from persisted storage other than the persisted storage (if any) accessible via the memory 420. In some embodiments, the storage module 440 may be used to store and retrieve data in a database. A database may be stored in persisted storage. Additionally or alternatively, the storage module 440 may access data stored remotely such as, for example, as may be accessed using a local area network (LAN), wide area network (WAN), personal area network (PAN), and/or a storage area network (SAN). In some embodiments, the storage module 440 may access data stored remotely using the communications module 430. In some embodiments, the storage module 440 may be omitted and its function may be performed by the memory 420 and/or by the processor 410 in concert with the communications module 430 such as, for example, if data is stored remotely.

Software comprising instructions is executed by the processor 410 from a computer-readable medium. For example, software may be loaded into random-access memory from persistent storage of the memory 420. Additionally or alternatively, instructions may be executed by the processor 410 directly from read-only memory of the memory 420.

Figure 5:
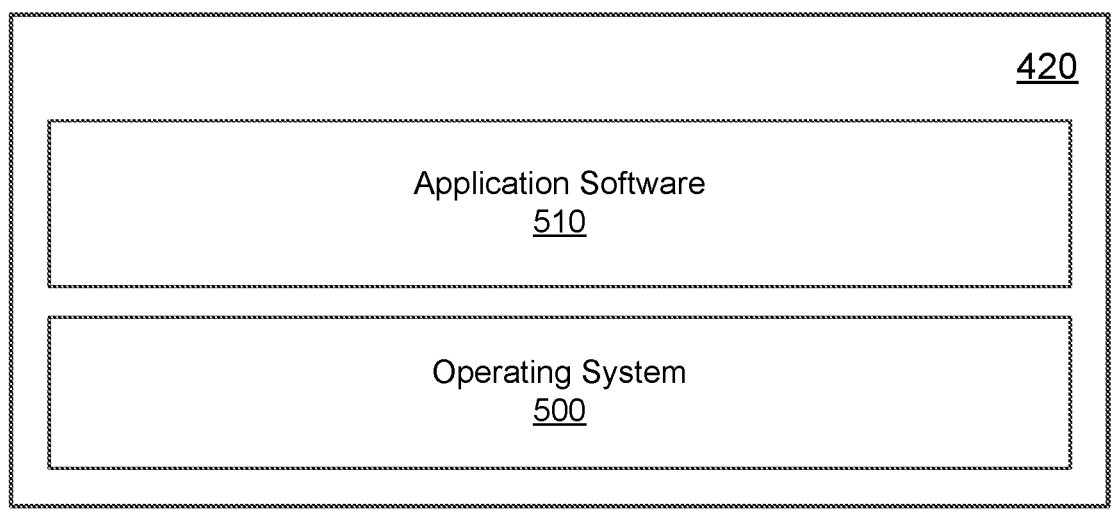
FIG. 5 shows a simplified organization of software components stored in the example computing systems of FIG. 4.

FIG. 5 depicts a simplified organization of software components stored in the memory 420 of the example computer system 400. As illustrated, these software components include an operating system 500 and an application software 510.

The operating system 500 is software. The operating system 500 allows the application software 510 to access the processor 410, the memory 420, the communications module 430, and the storage module 440 of the example computer system 400. The operating system 500 may be, for example, UNIX™, Linux™, Microsoft™ Windows™, Apple OSX™ or the like.

The application software 510, when executed, co-operates with the operating system 500 to adapt the example computer system 400 for some purpose and to provide some defined functionality. For example, the application software 510 may cooperate with the operating system 500 to adapt a suitable embodiment of the example computer system 400 to serve as the first system 130, second system 140, property data server 170 and/or offset servers 190.

Figure 6:
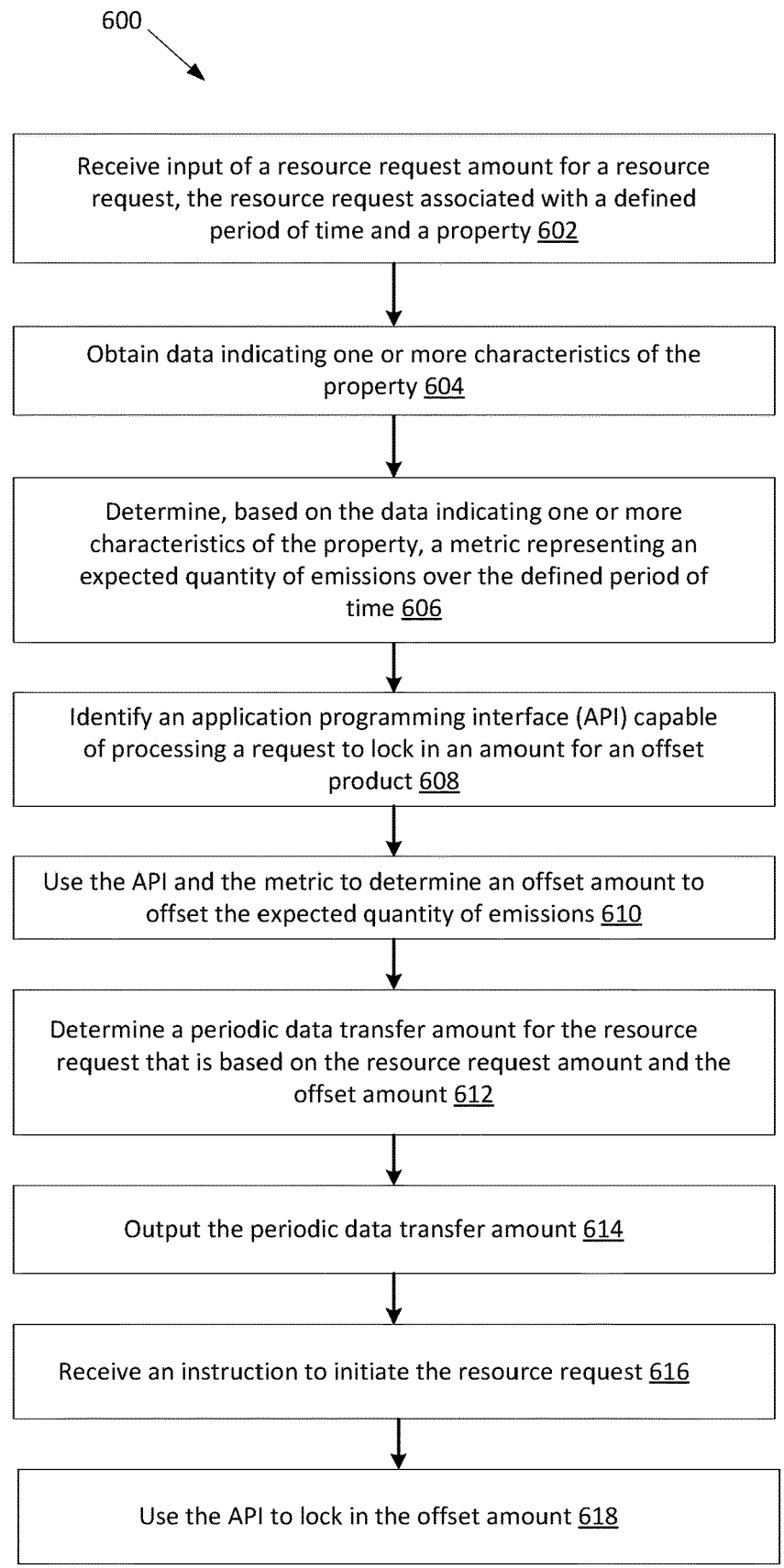
FIG. 6 is a flowchart showing operations performed in locking in an offset associated with a resource request, according to an example embodiment.

Reference will now be made to FIG. 6 which illustrates an example method 600 for locking in an offset associated with a resource request. The operations of the example method 600 may be performed by a computer system which may be of the type described herein. In some embodiments, the operations may be performed by a first computing system 130 of FIG. 1.

The computing system performing the method 600 may cooperate with other computing systems using a communications module. The communications module may be or include a hardware communications module. By way of example, the first computing system 130 may communicate with one or more of a second computing system 140, and a client device 110 in order to perform the method 600 or a variation thereof.

In operation 602, the computing system receives, via an input interface, input of a resource request amount for a resource request. The resource request may be associated with a defined period of time and a property.

For example, the data may be received from a client device via an upload interface displayed on the client device. The upload interface may be an interface, such as a web interface (e.g., a web page) displayed in a web browser on the client device, and may be provided, by the first computing system performing the method 600 of FIG. 6, to the client device for display. The upload interface may, for example, be provided by the first computing system in response to a request issued from the client device to the first computing system over the network. For example, the upload interface may be provided in response to an HTTP GET received at the first computing system from the client device. The upload interface may include one or more interface elements configured for receiving input of one or more parameters. For example, the upload interface may include one or more interface elements that prompt an operator or user to input data. For example, the upload interface may allow an operator or user to select one or more resource demand files and/or resource request parameters to upload.

Referring briefly to FIG. 7, an example upload interface 700 is illustrated. The upload interface 700 may be displayed at the client device in a web browser after an address associated with the upload interface 700 is input into the web browser; for example, using the address bar.

The upload interface 700 includes a mortgage section 702, a property section 704, a workplace section 706 and an offset section 708. Each section may include one or more elements for receiving user input.

The mortgage section 702 may include an option for uploading a resource request amount. The resource request amount may represent a mortgage amount.

The mortgage section 702 may also permit the selection or entry of a duration of time associated with the mortgage. The duration may define a period of time during which the mortgage is in effect and/or an amortization period for the mortgage.

The property section 704 may include one or more user interface elements for receiving input and uploading data representing one or more characteristics of the property. For example, the property section 704 may include an input area for receiving data representing an address of a location of the property. The address may be a unique identifier of the property. The property section 704 may also include an option for uploading a square footage associated with the property, for example a square footage of a dwelling associated with the property.

The property section 704 may permit the selection of a heating source. In selecting a heating source, a user may be permitted to select a heating source from a pull-down menu of heating sources. Example heating sources include natural gas and electric.

The property section 704 may also include an option for uploading data representing a year the dwelling was built.

The property section 704 may also include an option for uploading data representing a walkability score or rating indicating how easy it is to walk to amenities such as grocery stores near the dwelling.

Also shown in FIG. 7, the property section 704 may further include a selectable option for uploading a resource demand file. For example, a file locator selectable option may be displayed and used for identifying a pointer to a local file. The pointer may include, for example, a path name and filename of the resource demand file. Examples of resource demand files include utility bills in the form of an electronic document. The utility bills may be, for example, invoices for utilities, such as electricity or water, corresponding to the property.

The upload interface 700 also includes submit selectable option 710 which may be activated in order to trigger the sending of the resource demand file from the client device to the computer system performing the method 600 of FIG. 6.

The upload interface 700 may, in at least some embodiments, be provided to the client device after the client device has successfully authenticated itself as being associated with a particular account in a database using a credential (e.g., username/password, biometric data, etc.). That is, the client device uses a credential to confirm that it is associated with a particular account-holder, who may be referred to as an authenticated entity after successful authentication.

The resource demand file and other parameters that may be uploaded using the upload interface 700 are, therefore, associated with a particular account. The resource demand defined in the resource demand file may represent a past or future transfer of resources from that particular account to other accounts. The other accounts may include accounts in the same database (e.g., accounts at the same financial institution) and/or accounts in a different database (e.g., accounts at a different financial institution). In at least some implementations, the transfer may represent a payment.

A resource demand file and/or resource request parameters may be of the type described previously. For example, the resource demand file may define a single requested resource demand associated with a database. The database may be, for example, the data store 116 associated with the first computing system 106 or associated with the financial institution operating the first computing system 106. This data store 116 may maintain account balances for various bank accounts. The resource demand in the resource demand file may define information sufficient to initiate and complete a transfer. A resource demand file may be associated with a single transferor. For example, the resource demand file may include a transfer that transfers resources from an account associated with the authenticated entity. The system may extract such information, as well as other information, from the resource demand file and/or resource demand conditions file by applying optical character recognition (OCR) techniques to the and/or resource demand conditions file.

The workplace section 706 may include one or more user interface elements for receiving input and uploading data associated with the user's place of work. For example, the workplace section 706 may include an input area for receiving data representing an address of a location of a workplace of the user. The workplace section 706 may also permit the selection of an expected means of travel from the property to the workplace (e.g. by public transit, car, bike, or walk).

The offset section 708 may provide one or more user selectable options for selecting a carbon offset product from a plurality of carbon offset products and prompt for user input selecting an option. The selectable options may be presented as a link, button or other actionable user interface element and may include text. The text may include a name identifying a carbon offset product, a category of the offset product, a cost per tonne of the offset product and/or a vendor of the offset product. In particular, the selection offered may be to select: a type or category of carbon-offset project; a carbon offset vendor; and/or a country in which a carbon-offset project associated with an offset product is based. The selection offered through the upload interface 700 may be to identify an application programming interface to be used to determine and/or lock in an offset amount corresponding to a carbon offset product.

Actuating the submit selectable option 710 may cause the client device to upload the selected options, input data, and an instruction to the computing system to determine the offset amount.

Referring back to FIG. 6, the receipt by the computing system of the uploaded data and the instruction may trigger one or more operations of the method 600 of FIG. 6. For example, in operation 604, in response to receiving the input uploaded from the client device, the computer system may obtain data indicating one or more characteristics of the property.

In operation 604, the computing system obtains data indicating one or more characteristics of the property. The data indicating the one or more characteristics of the property made be obtained, for example, from data uploaded from the client device. In some embodiments, the one or more characteristics of the property include options selected or text input through the upload interface 700 of FIG. 7.

Examples of the one or more characteristics of the property include a square footage of a dwelling on the property, a heat source for the dwelling, a year of the property (which may reflect or be used to determine how well the dwelling is insulated), a walkability score or rating, historical data indicating energy usage corresponding to use of the property, and/or travel data associated with the property. The walkability score or rating may indicate how easy it is to walk to amenities such as, for example, grocery stores near the property. The travel may include travel data relating to travel between the property and another location, such as, for example, a workplace and/or one or more local amenities. The travel data may include an expected means of travel from the property to a workplace, a distance from the property to the workplace or local amenities, a proximity of the property to public transit, and whether the user has indicated a willingness to take public transportation or to use other means of transportation that are low or no carbon (e.g. biking and/or walking).

In some embodiments, the one or more characteristics of the property may also be obtained from a representation of a resource demand associated with the property. In some embodiments, the representation is in the form of an image. The representation may include a variety of elements including, for example, an address of the property, an amount to be electronically transferred by a due date, and a consumption amount of a resource consumed over a particular period of time through the operation or use of the property. In at least some embodiments, the consumed resource may be a natural resource or energy. Examples of consumed resources may include natural gas, propane, or water, or may electricity. The representation may be formatted, and the elements may be arranged, using an industry-wide standardized template, or formatted and arranged without using an industry-wide standardized template.

The resource demand and corresponding parameters may be received in various ways. For example, the system may include or be associated with a resource demand processing platform that allows third parties to send resource demands to a user of the computing system via the resource demand processing platform. In such instances, the system may receive the resource demand and/or parameters in a standardized format which allows for easy identification of necessary data such as a demand amount and defined date. In some embodiments the transfer may be an invoice, the demand amount may be a payment amount, and the defined date may be a due date of the payment.

In some embodiments, the resource demand may be received as a bill payment notification or a transfer message. The transfer message may represent a transfer of value from one account to another. The amount of value may be expressed, for example, in a particular currency, a currency identifier, and/or other information. The computing system may process a transfer message, which may be a computer-readable message configured for transmission over one or more computer networks between a sending device and a receiving device. The transfer message may be a structured message having a defined schema or set of predefined fields to contain data. The transfer message may be used to transfer resources from one entity to another entity. In particular, the transfer message may be used to effect a change in recorded ownership of resources. The resources may be currency, physical assets, credits, tokenized items like non-fungible tokens, computing resources such as memory allocated or processor time, access rights, or any other resource that may be owned or credited to an account associated with an account holder. In many of the examples herein, monetary resources may be referenced to illustrate concepts, but the present application is not necessarily solely applicable to financial or monetary instruments or resources.

The transfer message is specially formatted to include parameters of a transfer. The parameters may be included as metadata in the transfer message. Where the request to transfer is an ISO20022 message, the parameters may be included in an ISO20022 format. The parameters may include resource definition data. By way of example, the resource definition data may define a resource that is stored in or otherwise associated with a record associated with a transferor or recipient.

The transfer message may, in some implementations, be or represent a payment. Such a message may be referred to as a payment message. In such implementations, the transfer rail may be a payment rail such as a real time payment rail and the database management systems may be a financial institution system. In at least some such implementations, the records may represent bank accounts and a transfer may be a request to transfer value from a sender bank account to the recipient bank account. The transfer message may be sent from a first financial institution system, which is associated with a first financial institution, to a second financial institution system, which is associated with a second financial institution.

The transfer message may, in some implementations, be or include a request to transfer. A request to transfer may be a specially formatted message that is sent from a first database management system to a second database management system. The request to transfer may be sent from the first database management system to the second database management system over a transfer rail that is used for facilitating transfers between databases associated with different database management systems. For example, the first database management system may be associated with a first database and the second database management system may be associated with a second database. The databases may store account data. That is, the databases may store data that is associated with various accounts. In at least some implementations, each record in the database may be associated with a particular one of these accounts.

A request to transfer is a message that is sent on behalf of a recipient to initiate a transfer from a sender to the recipient. That is, the request to transfer is sent, on behalf of the recipient, from the database management system associated with the recipient to the database management system associated with the sender. The request to transfer requests a transfer from a record in the database that is associated with the sender to a record in the database that is associated with the recipient. The request to transfer includes one or more identifiers that identify the record associated with the sender and/or the record associated with the recipient. The identifier(s) may be or include an account number. The request to transfer may also include one or more identifiers that identify the database management system associated with the sender and/or that identify the database management system associated with the recipient. Such identifiers may be or include one or more of: a transit number and an institution number.

The request to transfer is a transfer initiation message. That is, the request to transfer is an initial message that may be used to cause a transfer to occur. Since the request to transfer is initiated by a recipient rather than a sender, the request to transfer may be considered to a pull-style transfer, which may be contrasted with typical push-style transfers. In at least some implementations, the request to transfer may be formatted as an ISO20022 message.

Additionally or alternatively, the system may allow for the upload of a resource demand. The uploaded resource demand may, for example, be in a document format such as Portable Document Format (PDF) file or a media format such as Joint Photographic Experts Group (JPEG or JPG), that may be processed to identify parameters included in the resource demand and parameters. For example, the data may be received from a client device via the upload interface 700 of FIG. 7 and a selectable option for uploading a resource demand file.

In some embodiments, the computing system may extract, from the resource demand file, data identifying a demand for a resource. Various techniques, including optical character recognition operations may be used to extract data from the representation. The extracted data may include the contents of various fields of the representation. The computing system may also extract from the representation of the resource demand data identifying one or more parameters corresponding to or associated with the resource demand.

In operation 604, the computing system obtains one or more parameters of the resource demand. In some embodiments, the one or more parameters may be obtained from the extracted data. Various techniques, includes natural language processing operations may be used to obtain a parameter from the extracted data.

Example parameters that may be included in the data identifying the resource demand include: a resource demand identifier identifying the particular resource demand; identification information of a type of resource demand (e.g. request for payment, request for transfer); consumption data (e.g. total consumption of electricity in kWh); identification information of the first and/or second account holders (e.g. full name, postal address, contact details, telephone number, email address, alias); an amount of resources to be transferred (e.g. total electricity charges); routing data; and a defined date. The routing data may include: identification information of the first and/or second system and/or the entity associated with, operating or managing the first and/or second system (e.g. a routing number, financial institution identifier, and/or branch transit number associated with the first and/or second system); and/or identification information of a first and/or second logical storage area, for example, a logical storage area identifier (e.g. bank account number), associated with, managed or controlled by a respective first and/or second account holder to or from which the amount of resources is to be transferred. A logical storage area may be or include an area of a data store. A logical storage area may further be or represent a bank account or other logical storage area for storing a quantity of a resource.

In some embodiments, the one or more characteristics of the property may include an address of the property, a consumption amount or other data obtained from the resource demand and/or other parameters included in the resource demand.

In some embodiments, a property identifier, such as the address of the property is used to query a property data server to obtain one or more characteristics of the property. In response to the query, the property data server may transmit to the computing system one or more characteristics of the property associated with that address. For example, the computing system may retrieve from the property data server one or more of the following data associated with the property: a square footage, a heat source, and/or a walkability score.

In operation 606, the computing system generates, based on the data indicating one or more characteristics of the property, a metric representing an expected quantity of emissions over the defined period of time. The emissions may be carbon emissions and the quantity of carbon emissions may, in some cases, be expressed in units of tons.

The metric may be calculated using, for example, a formula that takes as input one or more characteristics of the property and outputs a quantity of emissions. For example, the formula may use a means of transportation, a distance from the property to the workplace, and the defined period of time to calculate the carbon footprint associated with expected travel to work over the defined period of time.

In another embodiment, the metric may be determined by looking up an expected quantity of emissions from a lookup table that maps the one or more characteristics, or a combination of the one or more characteristics, to an expected quantity of emissions.

In some embodiments, a combination of formulas and lookup tables may be used to calculate the total expected emissions associated with operating the dwelling and/or travel to and from the property.

In some embodiments, by using one or more characteristics of the property obtained from an historical data, such as an historical resource demand including an actual consumption amount, the computing system may improve the accuracy of the determination of the metric that may otherwise depend on estimating a consumption amount based on characteristics such as the square footage and the age of the dwelling.

In operation 608, the computing system identifies an application programming interface capable of processing a request to lock in an amount for an offset product.

In some embodiments, each of the offset servers provides a respective application programming interface. The computing system may lock in offsets by identifying, from amongst a plurality of application programming interfaces, an application programming interface capable of locking in offsets and using the identified application programming interface to determine an offset amount and lock in the offset amount. The identification of the application programming interface may be based on a category of an offset product, a vendor of an offset product, a certification of the offset product, a project type of the offset product, and/or a location of an offset project of the offset product.

In some embodiments, the identified application programming interface may utilize a particular messaging protocol (e.g., a Representation State Transfer (REST) API (RESTful API) or a Simple Object Access Protocol (SOAP) API). Using the application programming interface may include generating a message in conformity with the particular messaging protocol for invoking the identified application programming interface.

In some embodiments, the application programming interface may be identified based on a designated offset server or designated application programming interface identifier stored in association with the account associated with the client device. In some cases, the offset server or application programming interface may be a default offset server or application programming interface rather than one actively designated by an entity associated with the account.

If an offset server or application programming interface has not been designated, then in this example, the computing system identifies an offset server or application programming interface based on the received input. The system may identify the candidate from a plurality of offset application programming interfaces based on one or more factors. For example, the computer system may identify the application programming interface based on lowest cost. In another example, the system may identify the application programming interface based on carbon offset categories supported. In a further example, the system may identify the application programming interface based on a vendor name. In yet a further example, the system may identify the gateway based on countries supported. For instance, in one implementation the computer system may select an offset application programming interface by identifying a subset of offset application programming interfaces that support a certain country, category and/or type and then identifying the candidate with the lowest cost. An optimization expression or formula may be used to weight a number of factors to sort and select the application programming interface in some cases.

In some embodiments, identifying the application programming interface may involve performing a search on a list of application programming interfaces for one or more application programming interface that fall within a category of application programming interfaces or offset products. For example, the computer system may store a directory of categories of offset products that map to offset application programming interfaces. The directory may be used to look up a particular application programming interface for a particular category of offset products. For example, the computer system may store a plurality of mapping definitions in a lookup table. A mapping definition may be defined by specifying a mapping of a category of an offset product to an application programming interface identifier.

In operation 610, the computing system using the identified application programming interface and the metric to determine an offset amount to offset the expected quantity of emissions.

In some embodiments, the computer system uses the identified application programming interface to query an offset server for a rate of an offset product. For example, the rate may be a cost per tonne of carbon offsets. The rate of the carbon offset and the expected quantity of carbon emissions may be used to determine an offset amount.

In some embodiments, the computer system may use the identified application programming interface to transmit to an offset server the expected quantity of carbon emissions and the offset server responds with an offset amount corresponding to the expected quantity of carbon emissions.

In operation 612, the computing system determines a periodic data transfer amount for the resource request that is based on the resource request amount and the offset amount. The period data transfer amount may be a future data transfer of a resource from an account associated with a user of the client device. A formula may be used to perform the calculation of the period data transfer amount based on, for example, the resource request amount, offset amount, and/or the defined period of time.

In some embodiments, the periodic data transfer amount corresponds to a monthly mortgage payment from an account associated with the computer system. The monthly mortgage payment may be calculated based on the mortgage amount, the carbon offset amount, the defined period of time and other data, such as, for example, a current interest rate for borrowing.

Once the computer system determines the offset amount and the periodic data transfer amount, then in operation 614, the computing system may transmit to the client device the offset amount and/or the periodic data transfer amount. In some embodiments, the periodic data transfer amount may take into account the offset amount.

Figure 8:
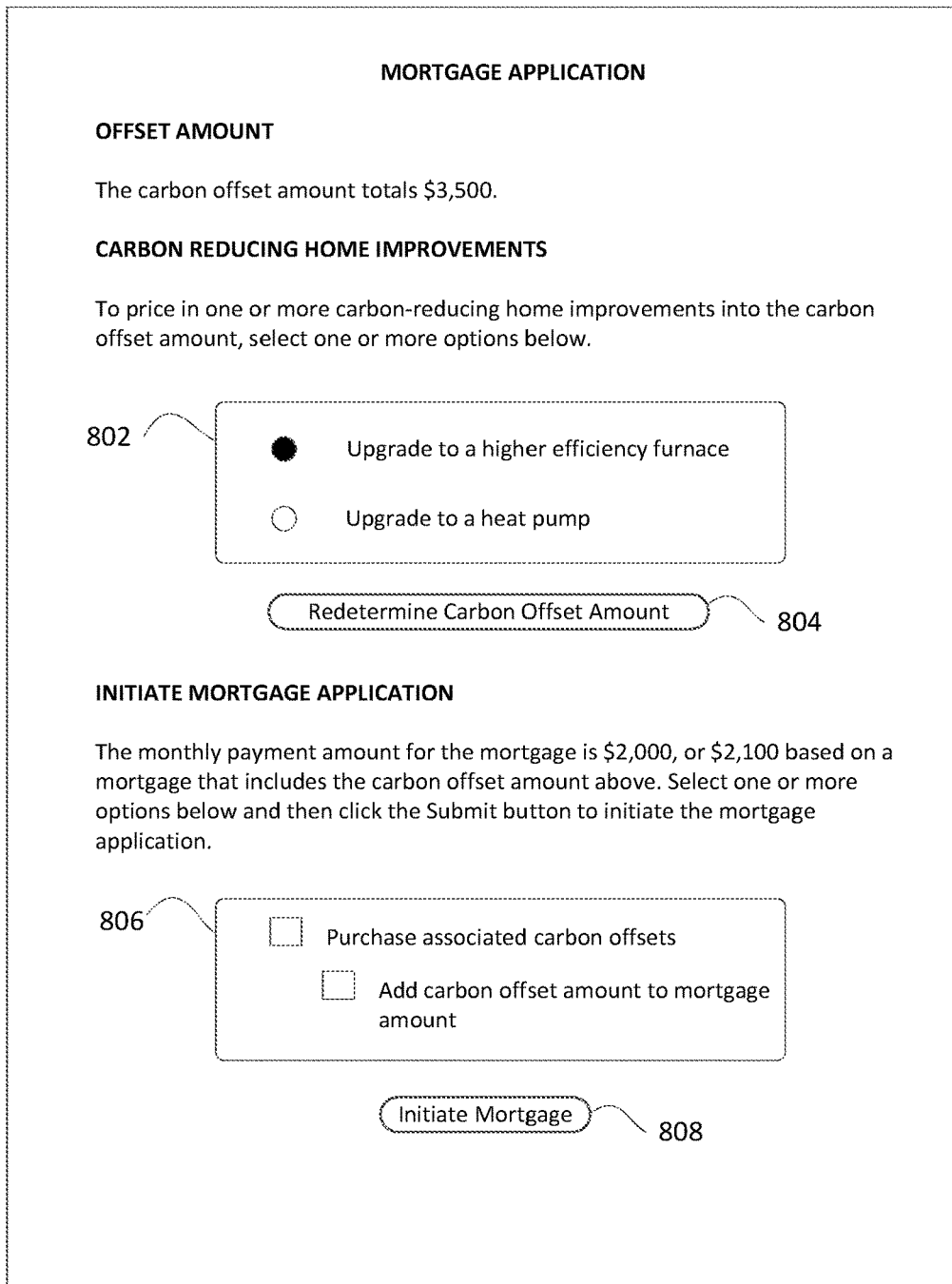
FIG. 8 is an example graphical input interface in connection with initiating a resource request and locking in an offset associated with the resource request.

Referring briefly to FIG. 8, an example input interface 800 is illustrated. The upload interface 700 may be displayed at the client device in a web browser after the offset amount and periodic data transfer amount are transmitted to the client device.

The input interface 800 includes the offset amount, an offset reduction section 802 and a resource request initiation section 806. The offset reduction section 802 and resource request initiation section 806 may include one or more elements for receiving user input.

The offset reduction section 802 may permit the selection of an option to price in one or more carbon-reducing home improvements into the cost of the mortgage. In some embodiments, the offset reduction section 802 may provide one or more user selectable options for selecting one or more carbon offset reductions from a plurality of carbon offset reduction techniques and may prompt for user input selecting one or more options. The selectable options may be presented as a link, button or other actionable user interface element and may include text. The text may include a brief description of the carbon-reducing home improvement. Examples of carbon-reducing home improvements include upgrading the dwelling to use a higher efficiency furnace or a heat pump.

Actuating the redetermine carbon offset amount element 804 may cause the client device to transmit to the computing system an instruction to recalculate of the offset amount based on the selected carbon-reducing home improvements, redetermine the periodic data transfer amount based on one or more emission-reducing improvements to the property, and retransmit the recalculated offset amount to the client device and updating the input interface 800 to include the recalculated offset amount and redetermined periodic data transfer amount. In this way, a user can see how such home modifications affect the monthly mortgage amount when the carbon cost is factored in. Such a feature may incentivize users to make home modifications that improve the carbon footprint of the property.

The resource request initiation section 806 may include a selectable option to purchase the determined offset amount of the offset product and/or to initiate a mortgage application that includes a funding amount for the determined offset amount.

In some embodiments, the resource request initiation section 806 may also include a selectable option to initiate a mortgage application that includes an amount set aside for the carbon-reducing home improvements.

Actuating the initiate mortgage element 808 may cause the client device to transmit to the computing system an instruction to initiate the mortgage application and lock in the carbon offset amount associated with the resource request.

Referring back to FIG. 6, in operation 616, the computing system receives the instruction to initiate the resource request. The resource request may include an amount for the determined offset amount and/or an amount set aside for emission-reducing improvements to the property.

In response to receiving the instruction to initiate the resource request, the computing system may take, in real-time, one or more actions. For example, the computing system may generate a notification based on the instruction. The generated notification may include one or more parameters. Example parameters include one or more parameters that are included in the resource request. In particular, the generated message may include: one or more identifiers of the resource request; one or more identifiers that identify the property associated with the resource request; one or more identifiers that identify a resource or data record associated with the requestor entity; and/or an identifier identifying the requestor entity. The identifier(s) may include or include an account number or name of an entity. The resource request may be a request to transfer a resource and may include one or more identifiers that identify the database management system associated with the sender and/or that identify the database management system associated with the recipient. Such identifiers may be or include one or more of a transit number and an institution number. In some cases, the notification may be transmitted to a third-party system.

In some embodiments, initiating the resource request includes performing one or more operations to obtain approval of the resource request and/or fulfil the resource request.

The generated notification may be a message for initiating the resource request and/or locking in an offset and may be sent to a computing system associated with the offset.

In operation 618, the computing system may use the application programming interface to lock in the offset amount. Locking in the offset amount may involve using the application programming interface to send the generated notification to an offset server in order to lock in the offset amount.

In some embodiments, locking in an offset amount may refer to agreeing to a specific fixed price (e.g. the offset amount) for an offset product. The fixed price may not change between the time that the offset amount is locked in and a future time when the resource request is fulfilled, so long as the fulfillment occurs within a specified time frame and there are not changes to the resource request. In some embodiments, locking in the offset amount means that the price of the offset product may not change before closing of the mortgage loan, as long as the closing occurs within a specified period and any other predetermined conditions (as defined when the lock-in occurs) are satisfied at the time of closing.

It will be appreciated that it may be that some or all of the above-described operations of the various above-described example methods may be performed in orders other than those illustrated and/or may be performed concurrently without varying the overall operation of those methods.

It will also be appreciated that some or all of the above-described operations of the various above-described example methods may be triggered by, or caused by, or performed in response to, one or more of the above-described operations, and may be performed in real-time.

Some of the embodiments described herein focus on a transfer message that is provided as either a payment or request for payment. However, it is understood that the present application is not limited to any such embodiments and that the embodiments described with respect to a particular type of transfer generally may be extended to other types of transfers.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
a communications module;
one or more processors coupled to the communications module; and
a memory coupled to the one or more processors and storing instructions that, when executed by the computer system, cause the computer system to:
receive, via an input interface, input of a resource request amount for a resource request, the resource request associated with a defined period of time and a property;
obtain data indicating one or more characteristics of the property;

determine, based on the data indicating one or more characteristics of the property, a metric representing an expected quantity of emissions over the defined period of time;

identify an application programming interface capable of processing a request to lock in an amount for an offset product;

use the application programming interface and the metric to determine an offset amount to offset the expected quantity of emissions;

determine a periodic data transfer amount for the resource request that is based on the resource request amount and the offset amount;

output the periodic data transfer amount;

receive an instruction to initiate the resource request; and use the application programming interface to lock in the offset amount.

2. The computer system of claim 1, wherein the instructions, when executed by the computer system, further cause the computer system to provide an input interface including a selectable option to redetermine the periodic data transfer amount based on one or more emission-reducing improvements to the property.

3. The computer system of claim 1, wherein the instructions, when executed by the computer system, further cause the computer system to include in the resource request an amount set aside for emission-reducing improvements to the property.

4. The computer system of claim 1, wherein the instructions, when executed by the computer system, further cause the computer system to provide an input interface including a selectable option to purchase the determined offset amount of the offset product.

5. The computer system of claim 1, wherein the instructions, when executed by the computer system, further cause the computer system to provide an input interface including a selectable option to initiate the resource request, wherein the resource request includes an amount for the determined offset amount.

6. The computer system of claim 1, wherein the data indicating one or more characteristics of the property includes travel data relating to travel between the property and another location.

7. The computer system of claim 1, wherein the data indicating the one or more characteristics of the property includes historical data indicating energy usage corresponding to use of the property.

8. The computer system of claim 1, wherein the instructions that, when executed by the computer system, cause the computer system to identify the application programming interface capable of processing a request to obtain offsets include instructions that further cause the computer system to identify the application programming interface, from amongst a plurality of application programming interfaces, based on a certification of the offset product.

9. The computer system of claim 1, wherein the instructions that, when executed by the computer system, cause the computer system to identify the application programming interface capable of processing a request to obtain offsets include instructions that further cause the computer system to identify the application programming interface, from amongst a plurality of application programming interfaces, based on a project type of the offset product.

10. The computer system of claim 1, wherein the instructions that, when executed by the computer system, cause the computer system to identify the application programming interface capable of processing a request to obtain offsets include instructions that further cause the computer system to identify the application programming interface, from amongst a plurality of application programming interfaces, based on a location of an offset project of the offset product.

11. A computer-implemented method comprising:

receiving, via an input interface, input of a resource request amount for a resource request, the resource request associated with a defined period of time and a property;

obtaining data indicating one or more characteristics of the property;

determining, based on the data indicating one or more characteristics of the property, a metric representing an expected quantity of emissions over the defined period of time;

identifying an application programming interface capable of processing a request to lock in an amount for an offset product;

using the application programming interface and the metric to determine an offset amount to offset the expected quantity of emissions;

determining a periodic data transfer amount for the resource request that is based on the resource request amount and the offset amount;

outputting the periodic data transfer amount;

receiving an instruction to initiate the resource request; and using the application programming interface to lock in the offset amount.

12. The method of claim 11, further comprising providing an input interface including a selectable option to redetermine the periodic data transfer amount based on one or more emission-reducing improvements to the property.

13. The method of claim 11, further comprising including in the resource request an amount set aside for emission-reducing improvements to the property.

14. The method of claim 11, further comprising providing an input interface including a selectable option to purchase the determined offset amount of the offset product.

15. The method of claim 11, further comprising providing an input interface including a selectable option to initiate the resource request, wherein the resource request includes an amount for the determined offset amount.

16. The method of claim 11, wherein the data indicating one or more characteristics of the property includes travel data relating to travel between the property and another location.

17. The method of claim 11, wherein the data indicating the one or more characteristics of the property includes historical data indicating energy usage corresponding to use of the property.

18. The method of claim 11, wherein identifying the application programming interface capable of processing a request to obtain offsets includes identifying the application programming interface, from amongst a plurality of application programming interfaces, based on a of certification of the offset product.

19. The method of claim 11, wherein identifying the application programming interface capable of processing a request to obtain offsets includes identifying the application programming interface, from amongst a plurality of application programming interfaces, based on a project type of the offset product.

20. A non-transitory computer-readable storage medium comprising processor-executable instructions which, when executed, configure one or more processors to:

receive, via an input interface, input of a resource request amount for a resource request, the resource request associated with a defined period of time and a property;

obtain data indicating one or more characteristics of the property;

determine, based on the data indicating one or more characteristics of the property, a metric representing an expected quantity of emissions over the defined period of time;

identify an application programming interface capable of processing a request to lock in an amount for an offset product;

use the application programming interface and the metric to determine an offset amount to offset the expected quantity of emissions;

determine a periodic data transfer amount for the resource request that is based on the resource request amount and the offset amount;

output the periodic data transfer amount;

receive an instruction to initiate the resource request; and use the application programming interface to lock in the offset amount.

* * * * *